US011084551B1

(12) United States Patent
Stull

(10) Patent No.: US 11,084,551 B1
(45) Date of Patent: Aug. 10, 2021

(54) FOLDABLE RECUMBENT TRICYCLE FRAME

(71) Applicant: Peter Stull, 676 St Route 244, NY (US)

(72) Inventor: Peter Stull, 676 St Route 244, NY (US)

( * ) Notice: Subject to any disclaimer, the term of this patent is extended or adjusted under 35 U.S.C. 154(b) by 2 days.

(21) Appl. No.: 16/855,092

(22) Filed: Apr. 22, 2020

(51) Int. Cl.
*B62K 15/00* (2006.01)
*B62K 5/05* (2013.01)
*B62K 5/06* (2006.01)

(52) U.S. Cl.
CPC ............ *B62K 15/006* (2013.01); *B62K 5/05* (2013.01); *B62K 5/06* (2013.01)

(58) Field of Classification Search
None
See application file for complete search history.

(56) References Cited

U.S. PATENT DOCUMENTS

| 3,210,555 | A | * | 10/1965 | Bristol ...................... H02P 9/04 |
| | | | | 290/40 R |
| 4,283,070 | A | | 8/1981 | Forrestall et al. |
| 4,786,070 | A | | 11/1988 | Adee |
| 4,911,458 | A | | 3/1990 | Lin et al. |
| D320,586 | S | | 10/1991 | Tellinghuisen |
| 5,145,196 | A | | 9/1992 | Langkamp |
| 5,263,732 | A | | 11/1993 | Harmeyer |
| 5,402,174 | A | * | 3/1995 | Takahashi .......... H04N 5/23209 |
| | | | | 348/347 |
| 5,419,574 | A | | 5/1995 | Krumm |
| 5,440,948 | A | * | 8/1995 | Cheng ................... B62K 15/006 |
| | | | | 280/278 |
| 6,062,571 | A | | 5/2000 | Stites |
| 6,367,824 | B1 | | 4/2002 | Hayashi |
| 6,402,174 | B1 | | 6/2002 | Maurer |
| 6,520,525 | B1 | * | 2/2003 | Yoon ..................... B62K 3/002 |
| | | | | 280/278 |
| 6,585,278 | B1 | | 11/2003 | Cerqua et al. |
| 8,210,555 | B2 | | 7/2012 | Belenkov et al. |
| 8,342,555 | B2 | | 1/2013 | Ball et al. |
| 8,720,927 | B2 | | 5/2014 | Ball et al. |
| 8,882,124 | B2 | | 11/2014 | Yap |

(Continued)

FOREIGN PATENT DOCUMENTS

DE    102010006378 B4 * 10/2012 ............... B62K 5/05
EP       2060480 A2      5/2009

*Primary Examiner* — Kevin Hurley
(74) *Attorney, Agent, or Firm* — Williams Intellectual Property; Timothy Snyder

(57) ABSTRACT

A foldable recumbent tricycle frame is described herein. The tricycle frame generally includes a central region, an anterior tube, a first lateral tube, a second lateral tube, a first posterior tube assembly, and a second posterior tube assembly. The first posterior tube assembly and second posterior tube assembly extend posteriorly relative to the central region. The first posterior tube assembly and second posterior tube assembly each comprise an anterior end, a posterior end, and a pivot joint disposed between the anterior end and posterior end. The posterior end is configured to assemble with a wheel. The pivot joints permit the wheel to fold underneath the tricycle frame into a folded position where a majority of the wheel resides inferior to the anterior tube, and where either a first side or opposing side of the third wheel resides adjacent to the anterior tube.

20 Claims, 5 Drawing Sheets

(56) References Cited

U.S. PATENT DOCUMENTS

| | | |
|---|---|---|
| 9,284,007 B2 | 3/2016 | Belenkov et al. |
| 10,189,529 B1 * | 1/2019 | Wang ...................... B62K 5/05 |
| 2010/0237582 A1 | 9/2010 | Belenkov et al. |

* cited by examiner

FOLDABLE RECUMBENT TRICYCLE FRAME

BACKGROUND OF THE INVENTION

Various types of folding recumbent tricycles are known in the prior art. A conventional folding recumbent tricycle may include a frame having a single posterior tube that connects with a back wheel. A pivot joint may be incorporated with the single posterior tube to permit the back wheel to fold into a folded position for storage or transportation. However, the single posterior tube is typically stressed in multiple directions, which requires a complex pivot joint that can endure these stresses and loads imposed on the pivot joint and the posterior tube while a user operates the tricycle. The single posterior tube and pivot joint are subject to lateral, bending, and twisting forces which make the single posterior tube and pivot joint prone to flex, wear and potentially failure.

Thus, there exists a need for a folding recumbent tricycle frame that is more rigid and durable under lateral and twisting forces without increasing the weight or cost of a tricycle.

FIELD OF THE INVENTION

The present invention generally relates to a folding recumbent tricycle frame, and more particularly, to a folding recumbent tricycle frame having two posterior tubes with pivot joints that are subject to less stress and therefore can be made more simple, light, and economical with no loss in durability or rigidity.

SUMMARY OF THE INVENTION

The general purpose of the folding recumbent tricycle frame, described subsequently in greater detail, is to provide a folding recumbent tricycle frame which has many novel features that result in a folding recumbent tricycle frame which is not anticipated, rendered obvious, suggested, or even implied by prior art, either alone or in combination thereof.

A foldable recumbent tricycle frame is described herein. The tricycle frame generally includes an anterior tube, a right lateral tube, a left lateral tube, a right posterior tube assembly, and a left posterior tube assembly. The anterior tube has a front end and a rear end, where the front end of the anterior tube is configured to assemble with bike pedals or gears. The right lateral tube has a medial end and a lateral end, where the medial end of the right lateral tube is connected near the rear end of the anterior tube, and where the right lateral tube extends laterally relative to the anterior tube. The lateral end of the right lateral tube is configured to assemble with a right wheel. The left lateral tube has a medial end and a lateral end, where the medial end of the left lateral tube is connected near the rear end of the anterior tube. The left lateral tube extends laterally relative to the anterior tube and in an opposite direction than the right lateral tube. The lateral end of the left lateral tube is configured to assemble with a left wheel.

The right posterior tube assembly has an anterior end and a posterior end, where the anterior end of the right posterior tube assembly is connected between the medial and lateral end of the right lateral tube. The right posterior tube assembly extends posteriorly relative to the anterior tube. The posterior end of the right posterior tube assembly is configured to assemble with the right side of a third wheel. The left posterior tube assembly has an anterior end and a posterior end, where the anterior end of the left posterior tube assembly is connected between the medial and lateral end of the left lateral tube. The left posterior tube assembly extends posteriorly relative to the anterior tube. The posterior end of the left posterior tube assembly is configured to assemble with the left side of the third wheel. A first pivot joint is disposed between the anterior end and posterior end of the right posterior tube assembly, and a second pivot joint is disposed between the anterior end and posterior end of the left posterior tube assembly. The first pivot joint and second pivot joint permit the third wheel to fold over or underneath the tricycle frame into a folded position such that the left side or the right side of the third wheel resides adjacent to the anterior tube.

Another embodiment of a foldable recumbent tricycle frame may include a central region, an anterior tube, a first lateral tube, a second lateral tube, a first posterior tube assembly, and a second posterior tube assembly. The anterior tube may extend anteriorly from the central region, where the anterior tube has a front end configured to assemble with bike pedals or gears. The first lateral tube may extend laterally from the central region, where the first lateral tube has a lateral end configured to assemble with a first wheel. The second lateral tube may extend laterally from the central region in an opposite direction than the first lateral tube, where the second lateral tube has a lateral end configured to assemble with a second wheel. The first posterior tube assembly extends posteriorly relative to the central region, where the first posterior tube assembly has an anterior end and a posterior end. The anterior end of the first posterior tube assembly is connected with a medial region of the first lateral tube, and the posterior end of the first posterior tube assembly is configured to assemble with a first side of a third wheel. The second posterior tube assembly extends posteriorly relative to the central region, where the second posterior tube assembly has an anterior end and a posterior end. The anterior end of the second posterior tube assembly is connected with a medial region of the second lateral tube, and the posterior end of the second posterior tube assembly is configured to assemble with an opposing side of the third wheel. The first posterior tube assembly further includes a first pivot joint between the anterior end and posterior end of the first posterior tube assembly. The second posterior tube assembly likewise includes a second pivot joint between the anterior end and posterior end of the second posterior tube assembly. The first pivot joint and second pivot joint permit the third wheel to fold over or underneath the tricycle frame into a folded position, where either the first side or the opposing side of the third wheel resides adjacent to the anterior tube.

A tricycle is also described herein. The tricycle includes a tricycle frame described herein, a first wheel assembled to a front end of a first lateral tube, a second wheel assembled to a front end of a second lateral tube, a third wheel assembled between posterior ends of a first posterior tube assembly and a second posterior tube assembly, pedals and/or gears assembled to a front end of an anterior tube, and a seat assembled superior to the tricycle frame.

Thus has been broadly outlined the more important features of the present folding recumbent tricycle frame so that the detailed description thereof that follows may be better understood and in order that the present contribution to the art may be better appreciated.

Objects of the present folding recumbent tricycle frame, along with various novel features that characterize the invention are particularly pointed out in the claims forming a part of this disclosure. For better understanding of the folding recumbent tricycle frame, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
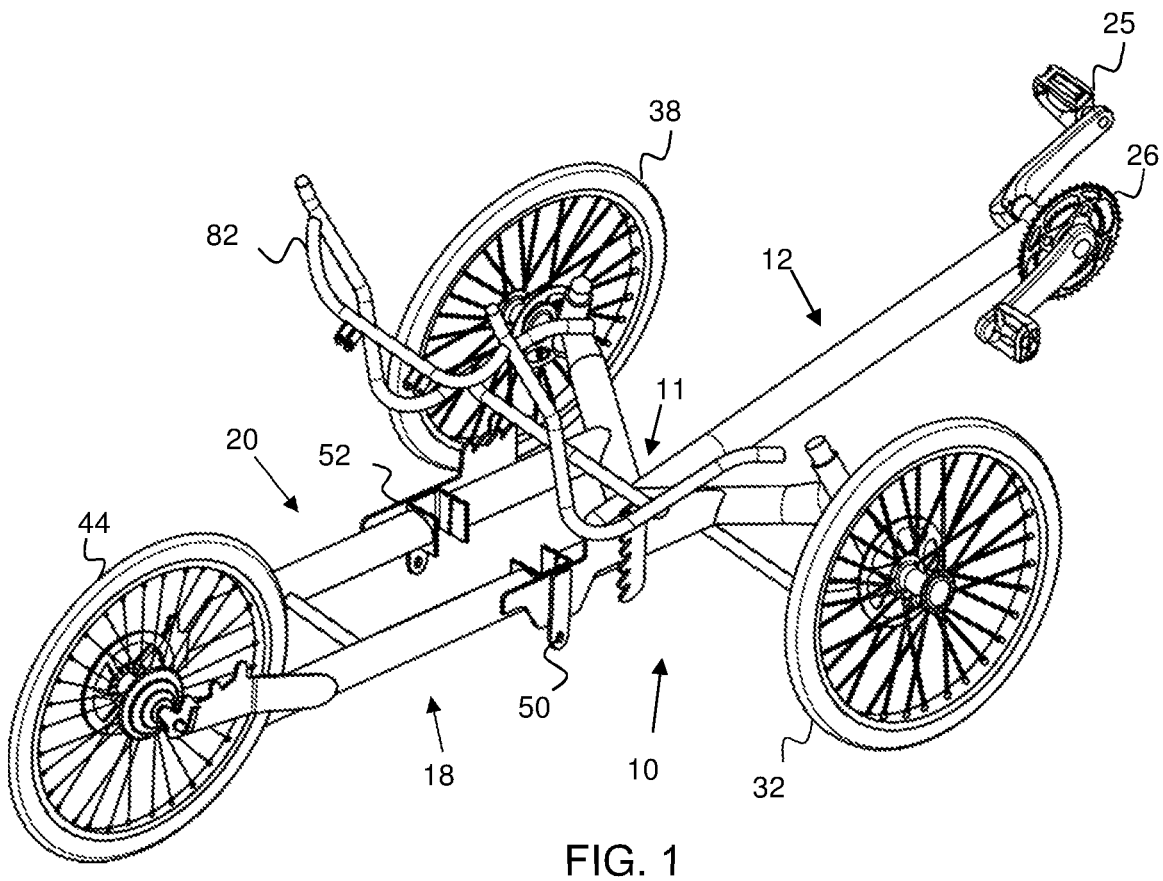
FIG. 1 is a perspective view of the tricycle frame in an operating position.

The present invention has utility as a foldable recumbent tricycle frame having two posterior tubes with pivot joints that are subject to less stress and therefore can be made more simple, light, and economical with no loss in durability or rigidity. The present tricycle frame makes a more rigid frame under lateral and bending forces without increasing the weight or cost of a tricycle. The recumbent tricycle is foldable for convenient storage or transportation. The following description of various embodiments of the invention is not intended to limit the invention to those specific embodiments, but rather to enable any person skilled in the art to make and use this invention through exemplary aspects thereof.

As used herein, the coordinates of the tricycle frame are made with reference to "anterior", "posterior", "superior", "inferior", and "lateral" directional terminology. "Anterior" refers to a frontal direction, or in a forward direction of travel of a recumbent tricycle. "Posterior" refers to a rearward direction, or in a backwards direction of travel of a recumbent tricycle. "Lateral" refers to a side direction that is neither anterior nor posterior. "Superior" refers to an upwards direction, or in a direction away from the ground when a tricycle is in use. And "inferior" refers to a downwards direction, or in a direction towards the ground when a tricycle is in use.

Also used herein is the term "tubes". The "tubes" may be standard tricycle framing tubes, but it should be appreciated that other framing equivalents may be used such as bars, rods, and pipes.

With reference now to the drawings, an example of the instant foldable recumbent tricycle frame employing the principles and concepts of the present foldable recumbent tricycle frame and generally designated by the reference number 10 will be described.

Referring to FIGS. 1 through 7, a particular embodiment of the present foldable recumbent tricycle frame 10 is illustrated. The tricycle frame 10 generally includes a central region 11, an anterior tube 12, a first lateral tube 14 (e.g., a right lateral tube), a second lateral tube 16 (e.g., a left lateral tube), a first posterior tube assembly 18 (e.g., a right posterior tube assembly), and a second posterior tube assembly 20 (e.g., a left posterior tube assembly). The anterior tube 12 has a front end 22 and an opposing end 24, where the front end 22 of the anterior tube 10 is configured to assemble with bike pedals 25 or gears 26. Extending laterally in opposite directions from the opposing end 22 of the anterior tube 12 is the first lateral tube 14 and the second lateral tube 16. The first lateral tube 14 has a lateral end 28 and a medial end 30, where the medial end 30 of the first lateral tube 14 is connected to the opposing end 22 of the anterior tube 12, and the lateral end 28 is configured to assemble with a first wheel 32. The first lateral tube 14 extends laterally relative to the anterior tube 12 (the anterior tube extends anteriorly relative to the tricycle frame 10), and in some embodiments, the first lateral tube 14 extends anterolaterally relative to the anterior tube 12. The second lateral tube 16 likewise has a lateral end 34 and a medial end 36, where the medial end 36 of the second lateral tube 16 is connected to the opposing end 22 of the anterior tube 12 and the lateral end 34 is configured to assemble with a second wheel 38. The second lateral tube 14 extends laterally relative to the anterior tube 12 and in an opposite direction of the first lateral tube 12, and in some embodiments, the second lateral tube 14 extends anterolaterally relative to the anterior tube 12. It should be appreciated, that the first lateral tube 14 and second lateral tube 16 do not have to connect endwise to the opposing end 22 of the anterior tube 12, where the opposing end 22 of the anterior tube 12 may refer to the posterior half of the anterior tube 12 or less.

The first posterior tube assembly 18 has an anterior end 40 and a posterior end 42, where the anterior end 40 is connected to a medial region of the first lateral tube 14, and the posterior end 42 is configured to assemble with a first side (e.g., right side) of a third wheel 44. The first posterior tube assembly 18 extends posteriorly relative to the anterior tube 12. The second posterior tube assembly 20 has an anterior end 46 and a posterior end 48, where the anterior end 46 is connected to a medial region of the second lateral tube 16, and the posterior end 48 is configured to assemble with an opposing side (e.g., left side) of the third wheel 44. The second posterior tube assembly 20 likewise extends posteriorly relative to the anterior tube 12, and in some embodiments, the first posterior tube assembly 18 and the second posterior tube assembly 20 are parallel to one another. Having two posterior tube assemblies (18, 20) is particularly advantageous for distributing the weight of the rider while maintaining the rigidity and durability of the tricycle frame 10. The downward, lateral, and bending forces are now distributed between the two tube assemblies (18, 20), rather than a single tube. This further allows the diameter of the two tube assemblies (18, 20) to be less than the conventional three or more inch diameter single tubes, which reduces the overall cost of a tricycle and reduces the complexity to incorporate a hinge mechanism to fold the tricycle. As such, in particular embodiments, the diameter of any tubes associated with the two tube assemblies (18, 20) are no greater than one inch.

The posterior ends (42, 48) of the first posterior tube assembly 18 and second posterior tube assembly 20 are configured to assemble with a third wheel 44. The assembly to the third wheel 44 may be a direct connection, or there may be other elements, mechanisms, or components known in the art that connect the posterior ends (42, 48) with the third wheel 44 that are considered to encompass the "configured" terminology. For example, a bracket may be connected to the first posterior tube assembly 18 or second posterior tube assembly 20 that directly attaches to the third wheel 44. Here, the bracket may be considered the posterior end (42, 48) of the first posterior tube assembly 18 or the second posterior tube assembly 20. Likewise, this "configured" principal extends to the front ends (22, 28, 34) of the anterior tube 12, first lateral tube 14, and second lateral tube 16 where other elements, mechanisms, or components known in the art may be used to assemble the pedals 25, gears 26, first wheel 32, or second wheel 38 thereto.

Figure 6:
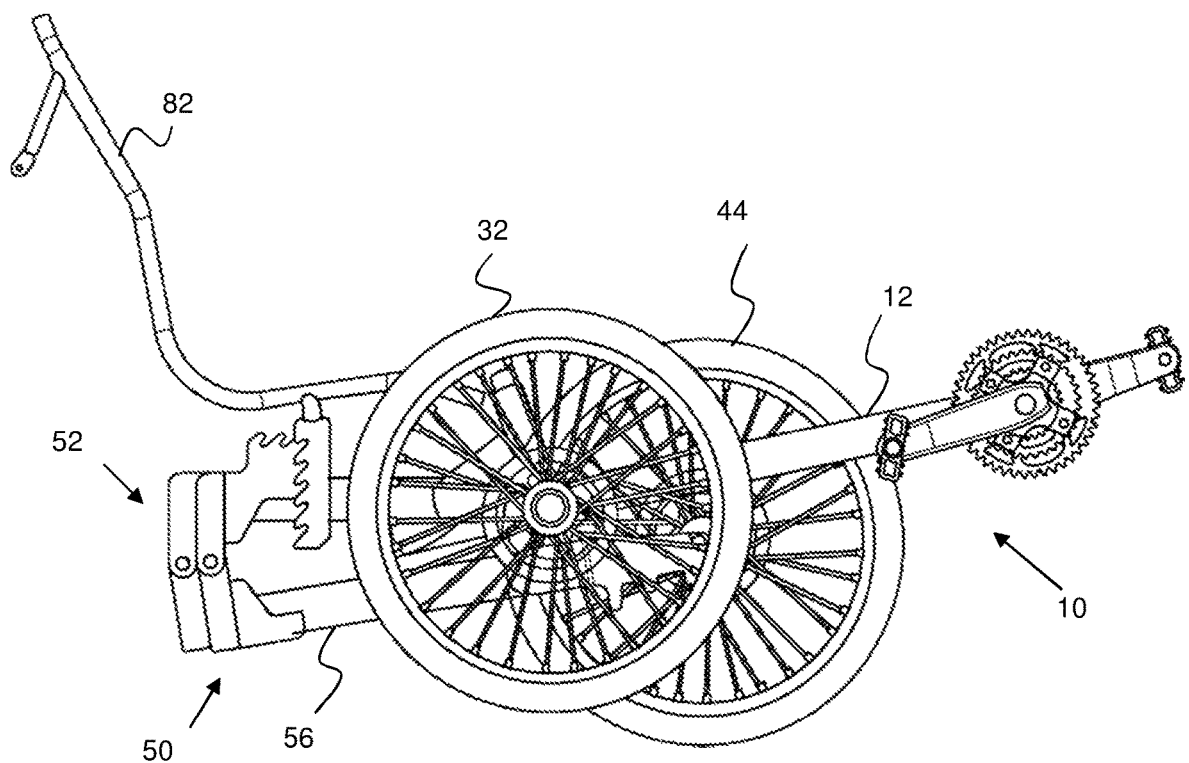
FIG. 6 is a side view of the tricycle frame in a folded position.
Figure 7:
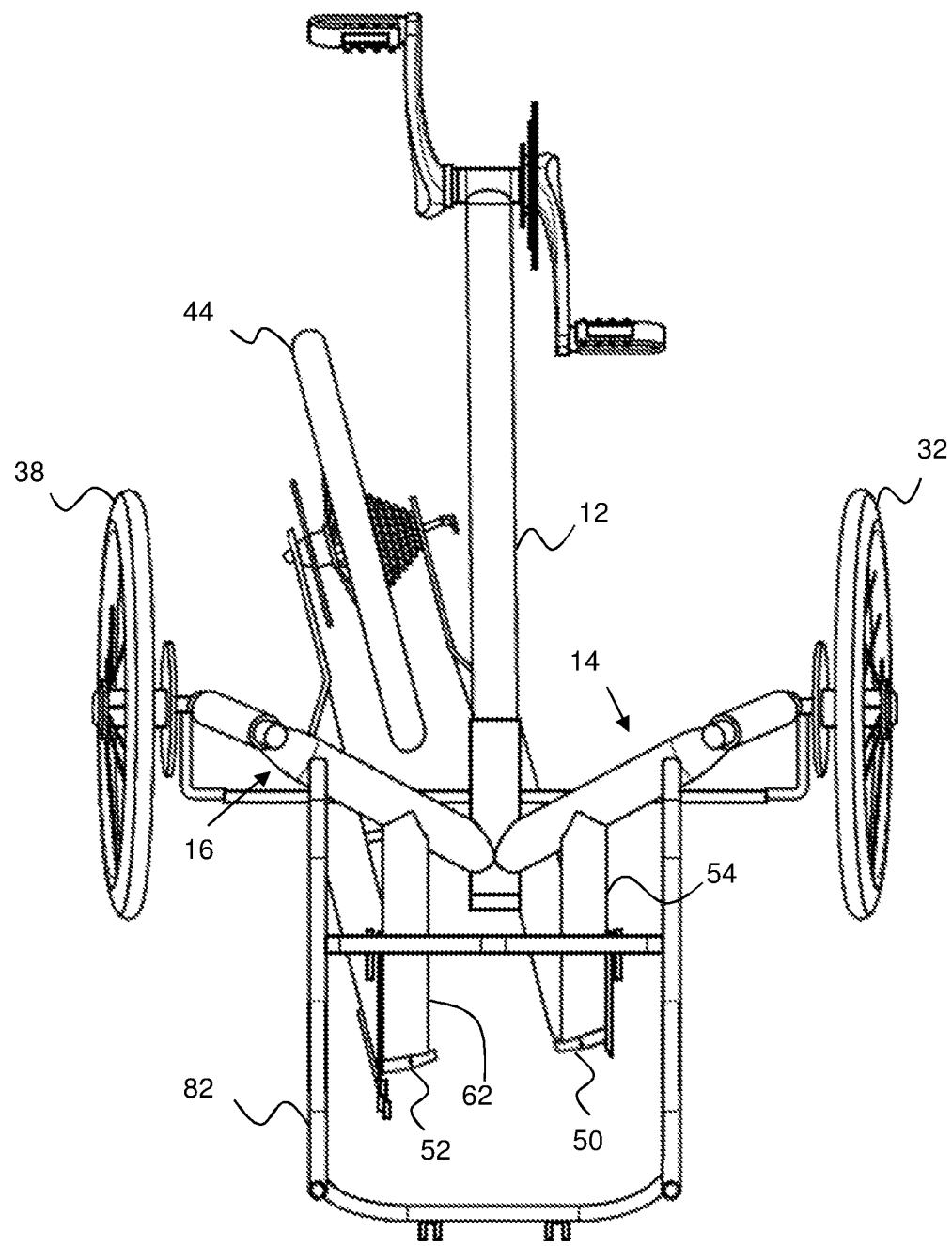
FIG. 7 is a top view of the tricycle frame in a folded position.

The first posterior tube assembly 18 further includes a first pivot joint 50 disposed between the anterior end 40 and posterior end 42 of the first posterior tube assembly 18. The second posterior tube assembly 20 further includes a second pivot joint 52 disposed between the anterior end 46 and posterior end 48 of the second posterior tube assembly 20. The first pivot joint 50 and second pivot joint 52 are configured to permit the third wheel 44 to fold over or underneath the tricycle frame 10 into a folded position as seen in FIGS. 6 and 7. When in the folded position underneath the tricycle frame 10, the third wheel 44 is in a vertical orientation where a majority of the third wheel 44 resides inferior to the anterior tube 12, and where either the first side or opposing side of the third wheel 44 resides adjacent to the anterior tube 12. When in the folded position over the tricycle frame 10, the third wheel 44 is in a vertical orientation where a majority of the third wheel 44 resides superior to the anterior tube 12, and where either the first side or opposing side of the third wheel 44 resides adjacent to the anterior tube 12.

The first pivot joint 50 and second pivot joint 52 may be configured with the first posterior tube assembly 18 and second posterior tube assembly 20 in a variety of ways. For example, the first pivot joint 50 and second pivot joint 52 may be least one of a hinge, a pin, a key, a gear, or a ball and socket. The first pivot joint 50 and second pivot joint 52 may be disposed at a medial region of the first posterior tube assembly 18 and second posterior tube assembly 20, respectively.

Figure 2:
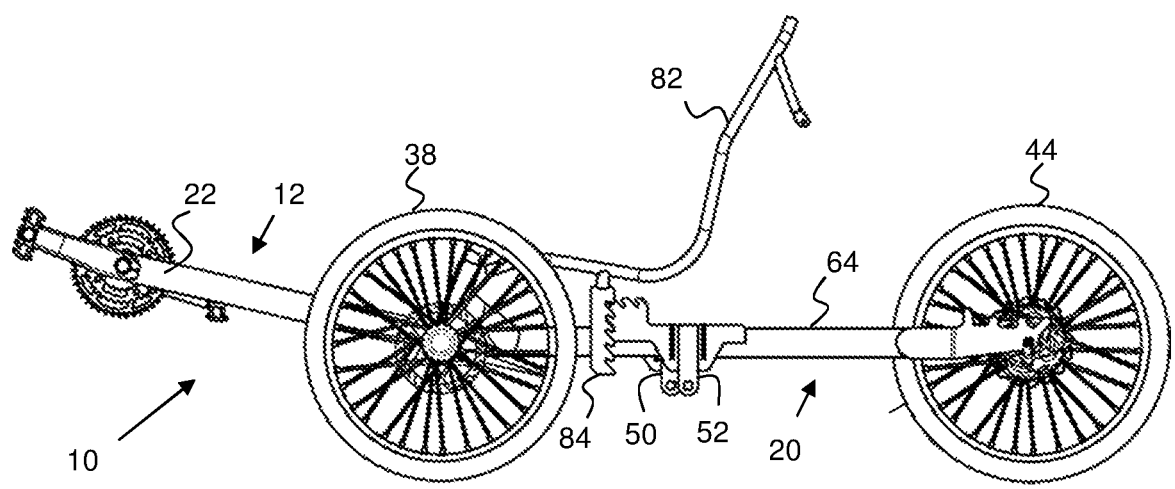
FIG. 2 is a side view of the tricycle frame in an operating position.
Figure 3:
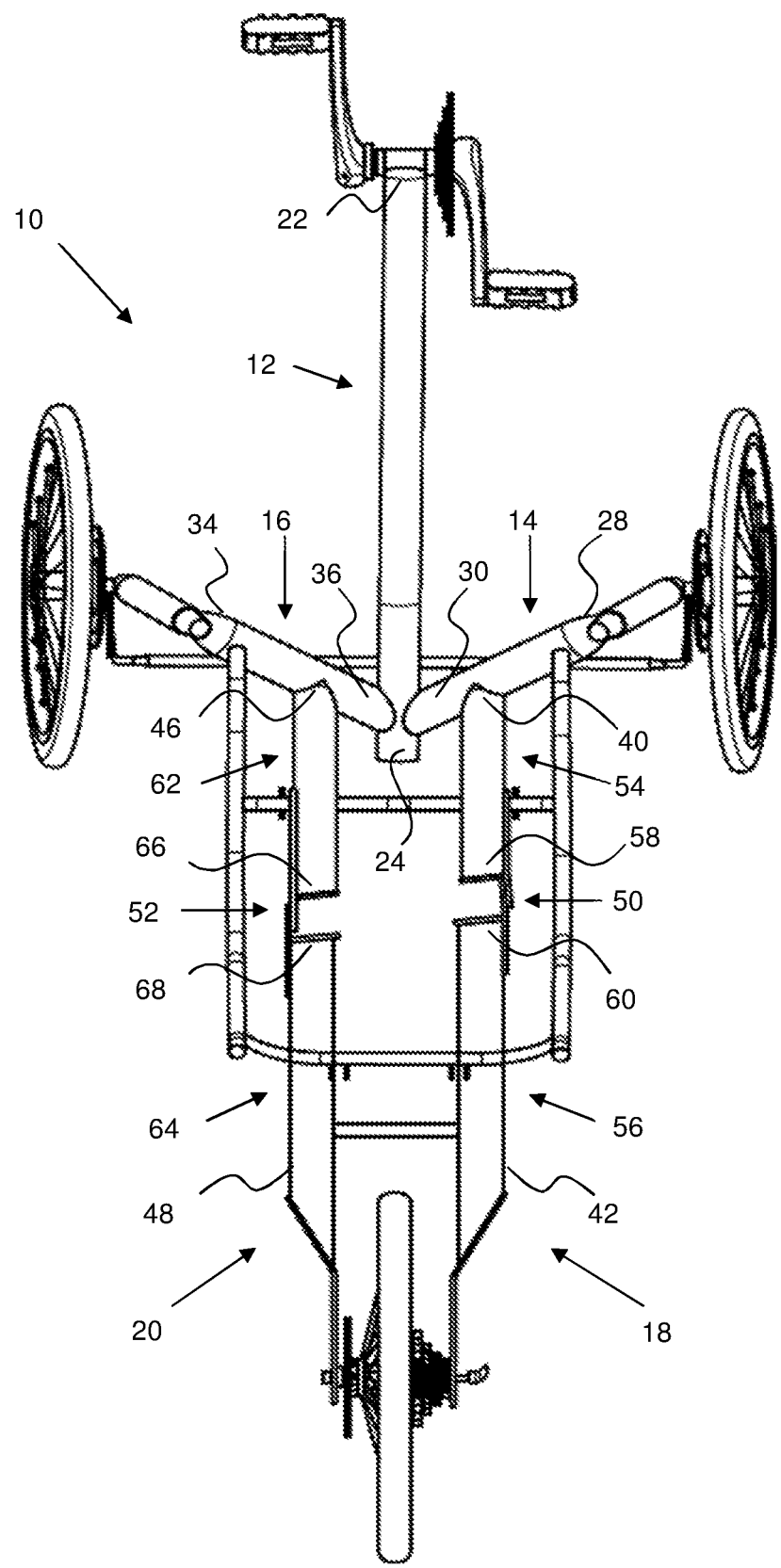
FIG. 3 is a top view of the tricycle frame in an operating position.

To permit the third wheel 44 to fold adjacent to the anterior tube 12, the first pivot joint 50 and the second pivot joint 52 may be disposed at different distances from the anterior ends (40, 46) of the first posterior tube assembly 18 and the second posterior tube assembly 20. In a particular embodiment, the first pivot joint 50 is disposed at a first distance from the anterior end 40 of the first posterior tube assembly 18, and the second pivot joint 52 is disposed at a second distance from the anterior end 46 of the second posterior tube assembly 20, where the first distance is less than the second distance as best seen in FIGS. 2, 3, and 7. This allows the third wheel 44 to fold to the left of the anterior tube 12. In other embodiments, the first distance is greater than the second distance (not shown), which allows the third wheel 44 to fold to the right of the anterior tube 12. It should be appreciated that either configuration permits the third wheel 44 to fold adjacent to the anterior tube 12 without departing from the scope of the invention.

To further permit the third wheel 44 to fold adjacent to the anterior tube 12, the first pivot joint 50 and second pivot joint 52 may be configured to angularly pivot the third wheel 44 at an acute angle from a central longitudinal axis of the anterior tube 12. The acute angle is with reference to a central longitudinal axis of the anterior tube 12 with the positive direction of the axis being towards the front end 22 of the anterior tube 12. Mechanisms for angularly pivoting the third wheel 44 is further described below.

In particular embodiments, the first pivot joint 50 and second pivot joint 52 may be disposed with the first posterior tube assembly 18 and the second posterior tube assembly 20 as follows. The first posterior tube assembly 18 may include a front tube 54 and a rear tube 56, where the front tube 54 has the anterior end 40 and an opposing end 58, and the rear tube 56 has the posterior end 42 and an opposing end 60. The first pivot joint 50 then connects the opposing ends (58, 60) of the front tube 54 and rear tube 56 together. Likewise, the second posterior tube assembly 20 includes a front tube 62 and a rear tube 64, where the front tube 62 has the anterior end 46 and an opposing end 66, and the rear tube 64 has the posterior end 48 and an opposing end 68. The second pivot joint 52 then connects the opposing end (66, 68) of the front tube 62 and the rear tube 64 together. To angularly pivot the third wheel 44 adjacent to the anterior tube 12, the first pivot joint 50 and the second pivot joint 52 may be disposed at a non-perpendicular angle relative to a central longitudinal axis of the first posterior tube assembly 18 and the second posterior tube assembly 20, respectively. For example, the first pivot joint 50 may connect with the opposing ends (58, 60) of the front tube 54 and the rear tube 56 at a non-perpendicular angle relative to a central longitudinal axis of the first posterior tube assembly 18. The second pivot joint 52 may connect with the opposing ends (66, 68) of the front tube 62 and the rear tube 64 at a non-perpendicular angle relative to a central longitudinal axis of the second posterior tube assembly 20. This allows the third wheel 44 to fold at an acute angle relative to the central longitudinal axis of the anterior tube 12. The angular connections are best seen in FIGS. 3 and 7. In a particular embodiment, the non-perpendicular angles of connection for the first pivot joint 50 and the second pivot joint 52 are the same.

Figure 4:
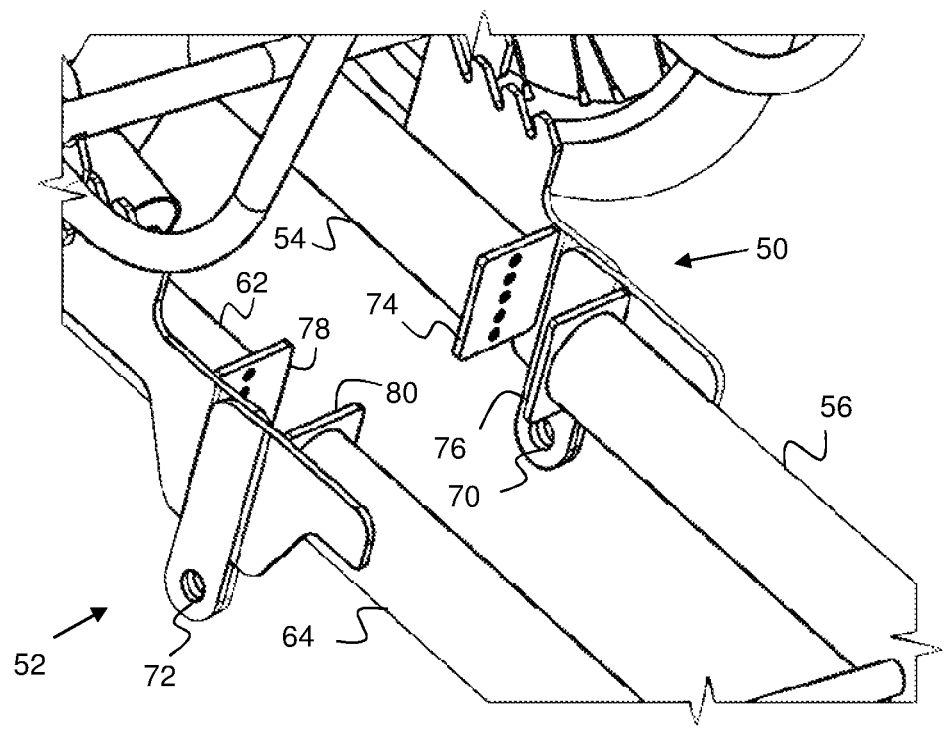
FIG. 4 is a detailed view of the pivot joints of the tricycle frame in an operating position.
Figure 5:
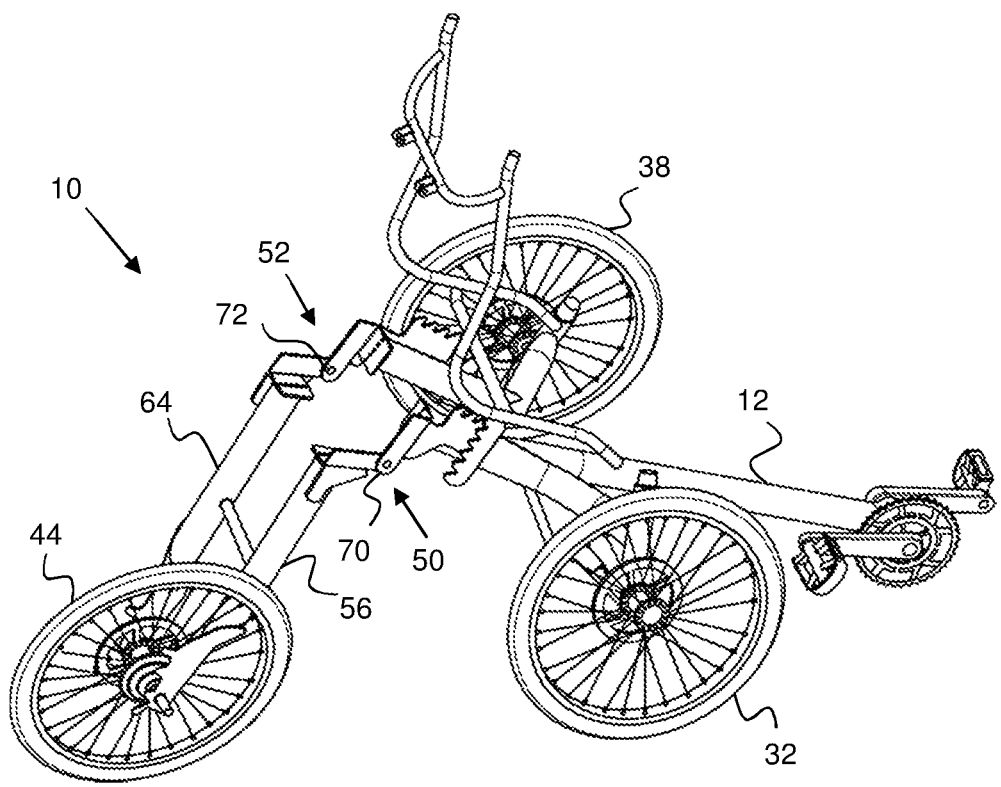
FIG. 5 is a perspective view of the tricycle frame being folded into a folded position.

In specific embodiments, with reference to FIGS. 4 and 5, the first pivot joint 50 may be a first hinge having a first pivot point 70, and the second pivot joint 52 may be a second hinge having a second pivot point 72. The pivot points (70, 72) may reside inferior to the first posterior tube assembly 18 and the second posterior tube assembly 20, respectively. Having the pivot points (70, 72) inferior to the posterior tube assemblies (18, 20) is particularly advantageous to the structural integrity of the tricycle because the downward force of the rider maintains the hinges (50, 52) in a closed position while a rider is operating the tricycle.

The first hinge may include a first leaf 74 connected to the opposing end 58 of the front tube 54 of the first posterior tube assembly 18, a second leaf 76 connected to the opposing end 60 of the rear tube 56 of the first posterior tube assembly 18, with the first pivot point 70 connecting the first leaf 74 and the second leaf 76. Likewise, the second hinge may include a first leaf 78 connected to the opposing end 66 of the front tube 62 of the second posterior tube assembly 20, a second leaf 80 connected to the opposing end 68 of the rear tube 64 of the second posterior tube assembly 20, with the second pivot point 72 connecting the first leaf 78 and the second leaf 80. To angularly pivot the third wheel 44, the first leafs (74, 78) may connect with the opposing ends (58, 66) of the front tubes (54, 62) at a non-perpendicular angle relative to a central longitudinal axes of the front tubes (54, 62), and the second leafs (76, 80) may connect with the opposing ends (60, 68) of the rear tubes (56, 64) at a non-perpendicular angle relative to a central longitudinal axes of the rear tubes (56, 64).

The tricycle frame 10 described above may be outfitted with additional parts to form a fully function tricycle. The tricycle may include the tricycle frame 10, a first wheel 32 assembled to the lateral end 28 of the first lateral tube 14, a second wheel 38 assembled to the lateral end 34 of the second lateral tube 16, a third wheel 44 assembled between the posterior ends (42, 48) of the first posterior tube assembly 18 and the second posterior tube assembly 20, pedals and/or gears assembled to the front end 22 of the anterior tube 12, and a seat 82 assembled superior to the tricycle frame 10. In particular embodiments, the seat 82 is assembled superior to the first posterior tube assembly 18 and the second posterior tube assembly 20 such that the weight imposed by the rider on the tricycle frame 10 is distributed between the first posterior tube assembly 18 and second posterior tube assembly 20. The tricycle may further include a seat adjustment mechanism 84 to permit a rider to adjust the height and/or anterior-posterior position of the seat 82.

Other Embodiments

While at least one exemplary embodiment has been presented in the foregoing detail description, it should be appreciated that a vast number of variations exist. It should also be appreciated that the exemplary embodiment or exemplary embodiments are only examples, and are not intended to limit the scope, applicability, or configuration of the described embodiments in any way. It should be understood that various changes may be made in the function and arrangement of elements without departing from the scope as set forth in the appended claims and the legal equivalents thereof.

What is claimed is:

1. A foldable recumbent tricycle frame, comprising:
an anterior tube having a front end and an opposing end, wherein said front end of the anterior tube is configured to assemble with bike pedals or gears;
a right lateral tube having a lateral end and a medial end, said medial end of the right lateral tube connected to the opposing end of the anterior tube, wherein the right lateral tube extends laterally relative to the anterior tube, and wherein said lateral end of the right lateral tube is configured to assemble with a right wheel;
a left lateral tube having a lateral end and a medial end, said medial end of the left lateral tube connected to the opposing end of the anterior tube, wherein the left lateral tube extends laterally relative to the anterior tube and in an opposite direction than the right lateral tube, and wherein said lateral end of the left lateral tube is configured to assemble with a left wheel;
a right posterior tube assembly having an anterior end and a posterior end, said anterior end of the right posterior tube assembly connected between the medial and lateral end of the right lateral tube, wherein the right posterior tube assembly extends posteriorly relative to the anterior tube, and wherein said posterior end of the right posterior tube assembly is configured to assemble with a right side of a third wheel;
a left posterior tube assembly having an anterior end and a posterior end, said anterior end of the left posterior tube assembly connected between the medial and lateral end of the left lateral tube, wherein the left posterior tube assembly extends posteriorly relative to the anterior tube, and wherein said posterior end of the left posterior tube assembly is configured to assemble with a left side of the third wheel;
a first pivot joint disposed between the anterior end and posterior end of the right posterior tube assembly;
a second pivot joint disposed between with the anterior end and posterior end of the left posterior tube assembly; and
wherein the first pivot joint and second pivot joint permit the third wheel to fold over or underneath the tricycle frame into a folded position such that either the right side or left side of the third wheel resides adjacent to the anterior tube.

2. The tricycle frame of claim 1 wherein the first pivot joint is disposed at a first distance from the anterior end of the right posterior tube assembly, and the second pivot joint is disposed at a second distance from the anterior end of the left posterior tube assembly, wherein the first distance and second distance are different to permit the third wheel to fold adjacent to the anterior tube when in the folded position.

3. The tricycle frame of claim 2 wherein the first pivot joint and second pivot joint angularly pivots the third wheel at an acute angle from a central longitudinal axis of the anterior tube to further permit the third wheel to fold adjacent to the anterior tube.

4. The tricycle frame of claim 3 wherein the right posterior tube assembly and left posterior tube assembly each comprise:
a front tube having the anterior end and an opposing end, and a rear tube having the posterior end and an opposing end; and
wherein the first pivot joint connects with the opposing ends of the front tube and the rear tube of the right posterior tube assembly, and the second pivot joint connects with the opposing ends of the front tube and the rear tube of the left posterior tube assembly.

5. The tricycle frame of claim 4 wherein the first pivot joint connects with the opposing ends of the front tube and the rear tube at a non-perpendicular angle relative to a central longitudinal axis of the right posterior tube assembly, and the second pivot joint connects with the opposing ends of the front tube and the rear tube at a non-perpendicular angle relative to a central longitudinal axis of the left posterior tube assembly, wherein the non-perpendicular angle connections permit the first pivot joint and second pivot joint to angularly pivot the third wheel.

6. The tricycle frame of claim 5 wherein the first pivot joint and second pivot joint comprises at least one of a hinge, a pin, a key, a gear, or a ball and socket.

7. The tricycle frame of claim 6 wherein the first pivot joint is a first hinge and the second pivot joint is a second hinge.

8. The tricycle frame of claim 7 wherein the pivot point of the first hinge resides inferior to the right posterior tube assembly, and the pivot point of the second hinge resides inferior to the left posterior tube assembly.

9. The tricycle frame of claim 8 wherein the first hinge comprises a first leaf connected to the opposing end of the front tube of the right posterior tube assembly, a second leaf connected to the opposing end of the rear tube of the right posterior tube assembly, a pivot point connecting the first leaf and the second leaf, wherein the first leaf connects with the opposing end of the front tube at a non-perpendicular angle relative to a central longitudinal axis of the front tube, and wherein the second leaf connects with the opposing end of the rear tube at a non-perpendicular angle relative to a central longitudinal axis of the rear tube.

10. The tricycle frame of claim 9 wherein the second hinge comprises a first leaf connected to the opposing end of the front tube of the left posterior tube assembly, a second leaf connected to the opposing end of the rear tube of the left posterior tube assembly, a pivot point connecting the first leaf and the second leaf, wherein the first leaf connects with the opposing end of the front tube at a non-perpendicular angle relative to a central longitudinal axis of the front tube, and wherein the second leaf connects with the opposing end of the rear tube at a non-perpendicular angle relative to a central longitudinal axis of the rear tube.

11. The tricycle frame of claim 1 wherein the third wheel is in a vertical orientation when in the folded position.

12. The tricycle frame of claim 1 wherein the right posterior tube assembly and left posterior tube assembly are parallel.

13. The tricycle frame of claim 1 wherein the right lateral tube extends anterolaterally relative to the anterior tube, and the left lateral tube extends anterolaterally relative to the anterior tube.

14. A tricycle comprising,
the tricycle frame of claim 1;
a right wheel assembled to the lateral end of the right lateral tube;
a left wheel assembled to the lateral end of the left lateral tube;
a third wheel assembled between the posterior ends of the right posterior tube assembly and the left posterior tube assembly;
pedals or gears assembled to the front end of the anterior tube; and
a seat assembled superior to the tricycle frame.

15. A foldable recumbent tricycle frame, comprising:
a central region;
an anterior tube extending anteriorly from the central region, wherein the anterior tube has a front end configured to assemble with bike pedals or gears;
a first lateral tube extending laterally from the central region, wherein the first lateral tube has a lateral end configured to assemble with a first wheel;
a second lateral tube extending laterally from the central region in an opposite direction than the first lateral tube, wherein the second lateral tube has a lateral end configured to assemble with a second wheel;
a first posterior tube assembly extending posteriorly relative to the central region, the first posterior tube assembly having an anterior end and a posterior end, wherein the anterior end of the first posterior tube assembly is connected with a medial region of the first lateral tube, and wherein the posterior end of the first posterior tube assembly is configured to assemble with a first side of a third wheel;
a second posterior tube assembly extending posteriorly relative to the central region, the second posterior tube assembly having an anterior end and a posterior end, wherein the anterior end of the second posterior tube assembly is connected with a medial region of the second lateral tube, and wherein the posterior end of the second posterior tube assembly is configured to assemble with an opposing side of the third wheel;
wherein the first posterior tube assembly comprises a first pivot joint between the anterior end and posterior end of the first posterior tube assembly, and the second posterior tube assembly comprises a second pivot joint between the anterior end and posterior end of the second posterior tube assembly; and
wherein the first pivot joint and second pivot joint permit the third wheel to fold over or underneath the tricycle frame into a folded position such that either the first side or the opposing side of the third wheel resides adjacent to the anterior tube.

16. The tricycle frame of claim 15 wherein the first pivot joint is disposed at a first distance from the anterior end of the first posterior tube assembly, and the second pivot joint is disposed at a second distance from the anterior end of the second posterior tube assembly, wherein the first distance and second distance are different to permit the third wheel to reside adjacent to the anterior tube when in the folded position.

17. The tricycle frame of claim 16 wherein the first pivot joint and second pivot joint angularly pivots the third wheel at an acute angle from a central axis of the anterior tube to further permit the third wheel to fold adjacent to the anterior tube.

18. The tricycle frame of claim 17 wherein the first posterior tube assembly and second posterior tube assembly each comprise:
a front tube having the anterior end and an opposing end, and a rear tube having the posterior end and an opposing end; and
wherein the first pivot joint connects with the opposing ends of the front tube and the rear tube of the first posterior tube assembly, and the second pivot joint connects with the opposing ends of the front tube and rear tube of the second posterior tube assembly.

19. The tricycle frame of claim 18 wherein the first pivot joint connects with the opposing ends of the front tube and the rear tube at a non-perpendicular angle relative to a central axis of the first posterior tube assembly, and the second pivot joint connects with the opposing ends of the front tube and the rear tube at a non-perpendicular angle relative to a central axis of the second posterior tube assembly, wherein the non-perpendicular angle connections permit the first pivot joint and second pivot joint to angularly pivot the third wheel.

20. The tricycle frame of claim 15 wherein the third wheel is in a vertical orientation when in the folded position.

* * * * *